(12) United States Patent
Kim et al.

(10) Patent No.: US 12,184,825 B2
(45) Date of Patent: Dec. 31, 2024

(54) APPARATUS AND METHOD FOR TRANSMITTING AND RECEIVING ADDITIONAL INFORMATION FOR 3D IMAGE

(71) Applicants: ELECTRONICS AND TELECOMMUNICATIONS RESEARCH INSTITUTE, Daemon (KR); KOOKMIN UNIVERSITY INDUSTRY ACADEMY COOPERATION FOUNDATION, Seoul (KR)

(72) Inventors: Sung-Hoon Kim, Daejeon (KR); Seongwon Jung, Daejeon (KR); Dong Wook Kang, Seoul (KR); Kyeong Hoon Jung, Seoul (KR); Insu Son, Seoul (KR); Seungjun Lee, Seoul (KR)

(73) Assignees: ELECTRONICS AND TELECOMMUNICATIONS RESEARCH INSTITUTE, Daejeon (KR); KOOKMIN UNIVERSITY INDUSTRY ACADEMY COOPERATION FOUNDATION, Seoul (KR)

( * ) Notice: Subject to any disclaimer, the term of this patent is extended or adjusted under 35 U.S.C. 154(b) by 89 days.

(21) Appl. No.: 17/994,981

(22) Filed: Nov. 28, 2022

(65) Prior Publication Data
US 2023/0171391 A1    Jun. 1, 2023

(30) Foreign Application Priority Data

Nov. 26, 2021 (KR) .......................... 10-2021-0165880
Nov. 25, 2022 (KR) .......................... 10-2022-0160680

(51) Int. Cl.
H04N 13/172    (2018.01)
H04N 13/139    (2018.01)
(Continued)

(52) U.S. Cl.
CPC ......... *H04N 13/172* (2018.05); *H04N 13/139* (2018.05); *H04N 13/194* (2018.05); *H04N 19/597* (2014.11); *H04N 2013/0085* (2013.01)

(58) Field of Classification Search
CPC .. H04N 13/172; H04N 13/139; H04N 13/194; H04N 2013/0085; H04N 13/122; H04N 13/106; H04N 13/128
(Continued)

(56) References Cited

U.S. PATENT DOCUMENTS 5,652,616 A * 7/1997 Chen .................... H04N 13/194
                                                 348/42
2006/0177123 A1* 8/2006 Ha ........................ H04N 13/161
                                                 348/42
(Continued)

FOREIGN PATENT DOCUMENTS

KR    10-2008-0027190    3/2008
KR    10-2011-0117858    10/2011
(Continued)

*Primary Examiner* — Tung T Vo
(74) *Attorney, Agent, or Firm* — KILE PARK REED & HOUTTEMAN PLLC

(57) ABSTRACT

A method and apparatus for generating additional information used to reconstruct an additional image through steps of: generating information for movement compensation based on the original right image of the stereoscopic image and the previous frame of the right image; and generating first additional information for reconstructing the right image to a high resolution based on the original right image and the information for movement compensation are provided.

17 Claims, 11 Drawing Sheets

(51) Int. Cl.
    *H04N 13/194*     (2018.01)
    *H04N 19/597*     (2014.01)
    *H04N 13/00*      (2018.01)

(58) Field of Classification Search
    USPC .................................................. 375/240.16
    See application file for complete search history.

(56)            References Cited

U.S. PATENT DOCUMENTS

2009/0060280  A1*   3/2009   Choi ....................... G06T 7/593
                                                            382/106
2009/0190662  A1*   7/2009   Park ....................... H04N 19/51
                                                           375/E7.123
2014/0307049  A1   10/2014   Kim et al.
2016/0150237  A1    5/2016   Kim et al.
2018/0027304  A1    1/2018   Kim et al.
2019/0068947  A1    2/2019   Leontaris et al.
2021/0029371  A1    1/2021   Seregin et al.

FOREIGN PATENT DOCUMENTS

KR          10-1349459        1/2014
KR       10-2022-0032563      3/2022

* cited by examiner

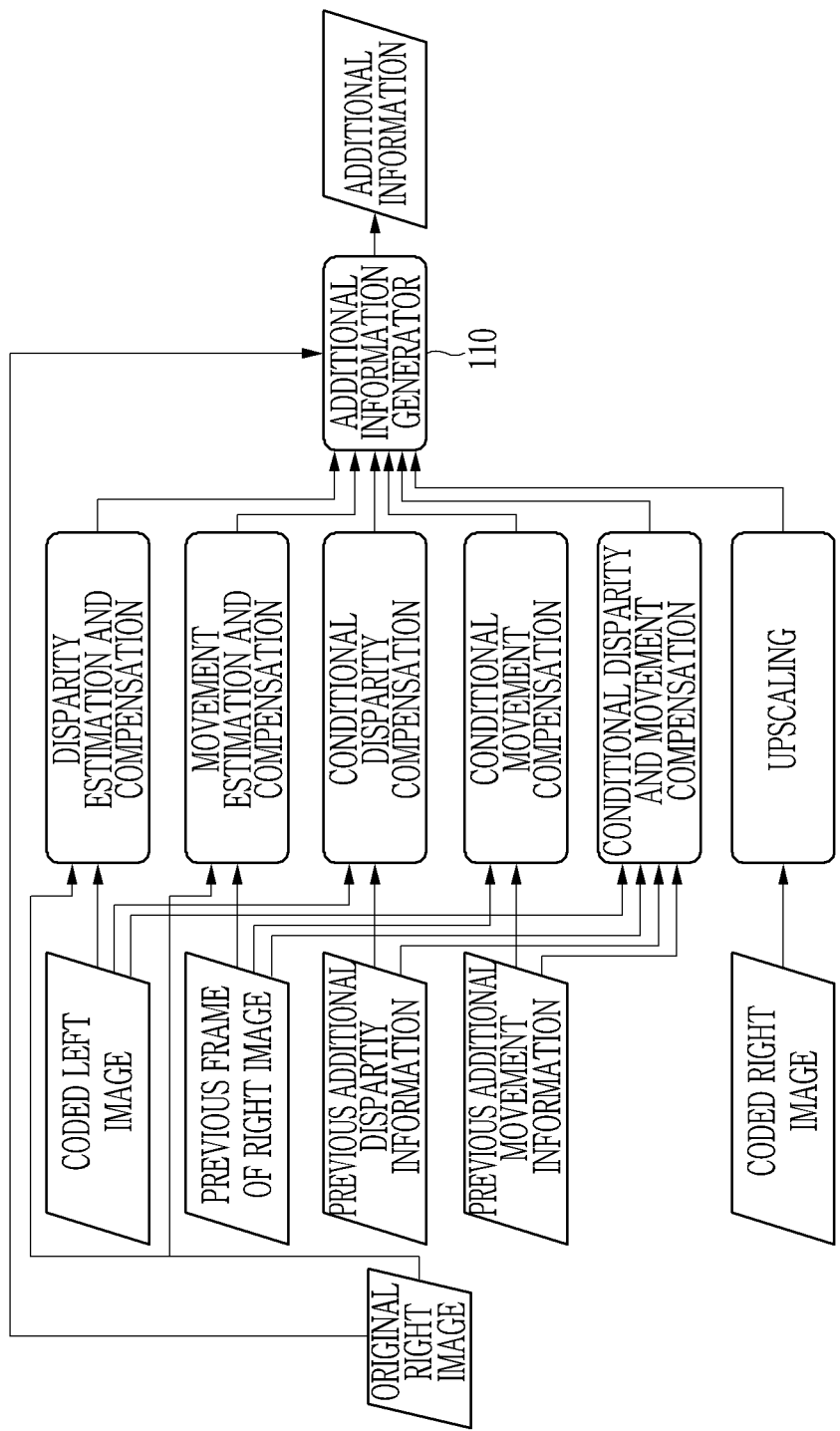

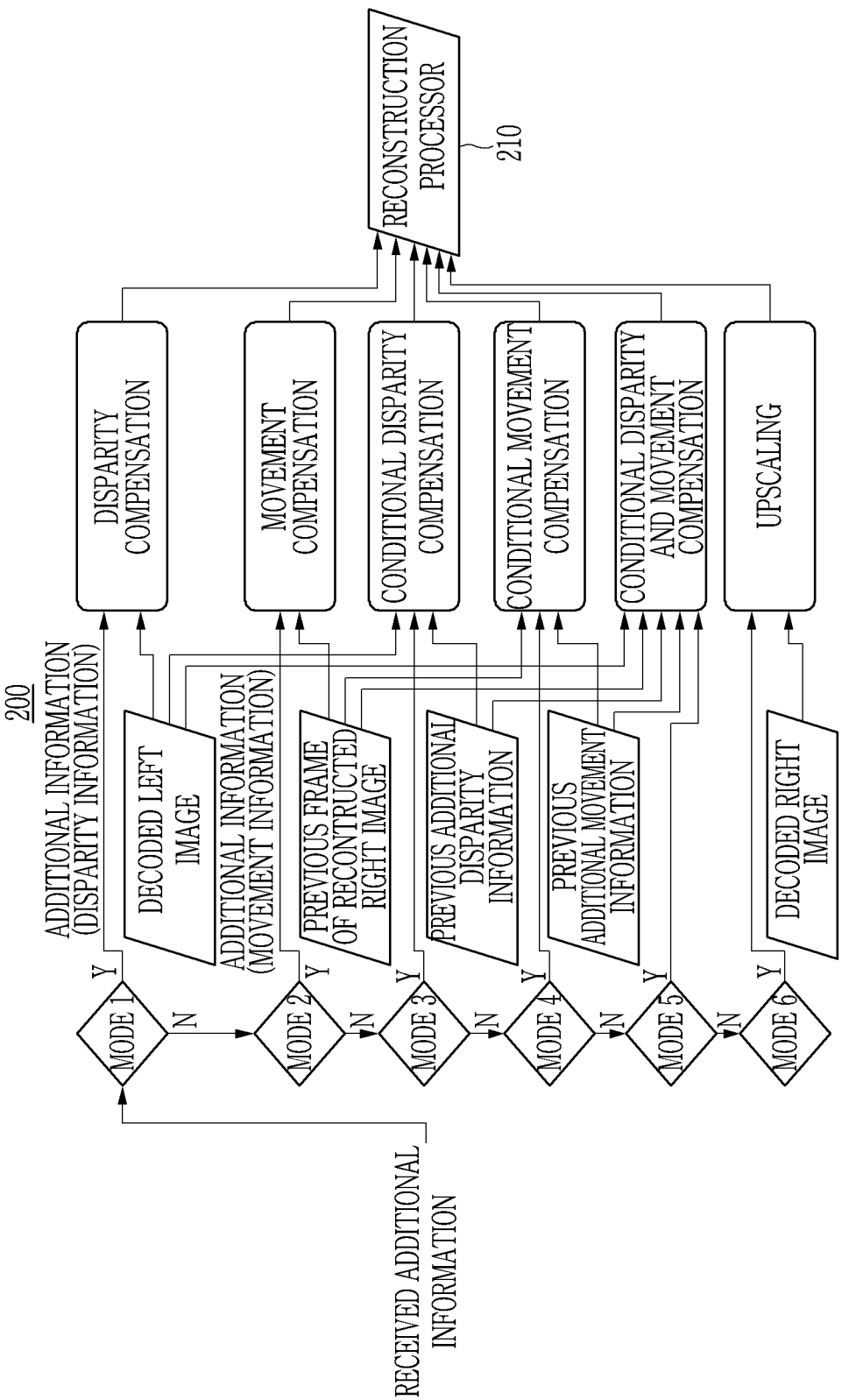

APPARATUS AND METHOD FOR TRANSMITTING AND RECEIVING ADDITIONAL INFORMATION FOR 3D IMAGE

CROSS-REFERENCE TO RELATED APPLICATION

This application claims priority to and the benefit of Korean Patent Application No. 10-2021-0165880 filed in the Korean Intellectual Property Office on Nov. 26, 2021, and Korean Patent Application 10-2022-0160680 filed in the Korean Intellectual Property Office on Nov. 25, 2022, the entire contents of which are incorporated herein by reference.

TECHNICAL FIELD

This description relates to a method and apparatus for transmitting/receiving additional information for reconstruction of a 3D image.

BACKGROUND

A stereo three-dimensional (3D) image may be composed of a left image and a right image. When the left image and the right image are transmitted through a fixed broadcasting system and a mobile broadcasting system, the existing fixed broadcasting service and mobile broadcasting service can be provided. In addition, a stereo 3DTV broadcasting service can be provided through a terminal capable of receiving both left image and right image.

In order to improve image quality of such user-selectable stereoscopic media, ultra-high-resolution technology can be selectively applied using video enhancement information (VEI). The VEI can be used to selectively improve image quality for low-resolution image blocks in which high-resolution matching blocks are missing.

SUMMARY

Embodiments provide an apparatus for generating additional information for reconstructing an additional image.

Embodiments provide an apparatus for receiving an additional image.

Embodiments provide a method for receiving an additional image.

According to an embodiment, an apparatus for generating additional information for reconstructing an additional image is provided. The apparatus includes a processor and memory, wherein the processor executes a program stored in the memory to perform: generating information for movement compensation based on an original right image of a stereoscopic image and a previous frame of the right image; and generating first additional information to reconstruct the right image to high resolution based on the original right image and the information for movement compensation.

In an embodiment, when generating information for movement compensation based on an original right image of a stereoscopic image and a previous frame of the right image, the processor may perform estimating a movement vector based on difference between the previous frame of the right image and a current frame of the right image.

In an embodiment, the processor may execute the program to further perform: generating information for conditional movement compensation of a current frame of the right image based on the previous frame of the right image and additional movement information of the previous frame of the right image; and generating second additional information based on the original right image and the information for conditional movement compensation.

In an embodiment, the processor may execute the program to further perform: generating information for conditional disparity and movement compensation of the right image based on encoded left image of the stereoscopic image, the previous frame of the right image, additional information of the previous frame, and additional movement information of the previous frame of the right image; and generating third additional information based on the original right image and the information for conditional disparity and movement compensation.

According to another embodiment, an apparatus for receiving an additional image is provided. The apparatus includes a processor and memory, wherein the processor executes a program stored in the memory to perform: performing movement estimation and compensation for the additional image based on first additional information when additional information for reconstructing the additional image is the first additional information for movement compensation of the additional image; and reconstructing the additional image to high resolution based on a result of the movement estimation and compensation.

In an embodiment, when performing movement estimation and compensation for the additional image based on first additional information, the processor may perform performing the movement estimation and compensation of a current frame of the additional image using movement information obtained from the first additional information and a reconstructed previous frame of the additional image.

In an embodiment, the processor may execute the program to further perform: performing conditional movement compensation for a current frame of the additional image based on second additional information when the additional information is the second additional information for conditional movement compensation of the additional image; and reconstructing the additional image to high resolution based on a result of the conditional movement compensation.

In an embodiment, when performing the conditional movement compensation for the current frame of the additional image based on the second additional information, the processor may perform performing the conditional movement compensation using the second additional information, reconstructed previous frame of the additional image, and additional movement information of the previous frame obtained when the previous frame has been reconstructed.

In an embodiment, when performing the conditional movement compensation using the second additional information, reconstructed previous frame of the additional image, and additional movement information of the previous frame, the processor may perform performing movement compensation on a pixel having a movement vector of the previous frame within a divided block of the additional image.

In an embodiment, the processor may execute the program to further perform: performing conditional disparity and movement compensation for a current frame of the additional image based on third additional information when the additional information is the third additional information for the conditional disparity and movement compensation of the additional image; and reconstructing the additional image to high resolution based on a result of the conditional disparity and movement compensation.

In an embodiment, when performing the conditional disparity and movement compensation for a current frame of the additional image based on the third additional information, the processor may perform performing the conditional disparity and movement compensation using the third additional information, a reconstructed reference image corresponding to the additional image, a reconstructed previous frame of the additional image, additional disparity information of the previous frame of the additional image, and additional movement information of the previous frame obtained when the previous frame has been reconstructed.

In an embodiment, when performing the conditional disparity and movement compensation using the third additional information, a reconstructed reference image corresponding to the additional image, a reconstructed previous frame of the additional image, additional disparity information of the previous frame of the additional image, and additional movement information of the previous frame obtained when the previous frame has been reconstructed, the processor may perform performing disparity compensation on a pixel having the additional disparity information of the previous frame within a divided block of the additional image.

In an embodiment, when performing the conditional disparity and movement compensation using the third additional information, a reconstructed reference image corresponding to the additional image, a reconstructed previous frame of the additional image, additional disparity information of the previous frame of the additional image, and additional movement information of the previous frame obtained when the previous frame has been reconstructed, the processor may perform performing movement compensation on a pixel having movement vector information of the previous frame within a divided block of the additional image.

According to yet another embodiment, a method for receiving an additional image is provided. The method includes: performing movement estimation and compensation for the additional image based on first additional information when additional information for reconstructing the additional image is the first additional information for movement compensation of the additional image; and reconstructing the additional image to high resolution based on a result of the movement estimation and compensation.

In an embodiment, the performing movement estimation and compensation for the additional image based on first additional information may include performing the movement estimation and compensation of a current frame of the additional image using movement information obtained from the first additional information and a reconstructed previous frame of the additional image.

In an embodiment, the method may further include: performing conditional movement compensation for a current frame of the additional image based on second additional information when the additional information is the second additional information for conditional movement compensation of the additional image; and reconstructing the additional image to high resolution based on a result of the conditional movement compensation.

In an embodiment, the performing the conditional movement compensation for the current frame of the additional image based on the second additional information may include performing the conditional movement compensation using the second additional information, reconstructed previous frame of the additional image, and additional movement information of the previous frame obtained when the previous frame has been reconstructed.

In an embodiment, the performing the conditional movement compensation using the second additional information, reconstructed previous frame of the additional image, and additional movement information of the previous frame obtained when the previous frame has been reconstructed may include performing movement compensation on a pixel having a movement vector of the previous frame within a divided block of the additional image.

In an embodiment, the method may further include: performing conditional disparity and movement compensation for a current frame of the additional image based on third additional information when the additional information is the third additional information for the conditional disparity and movement compensation of the additional image; and reconstructing the additional image to high resolution based on a result of the conditional disparity and movement compensation.

In an embodiment, the performing the conditional disparity and movement compensation for a current frame of the additional image based on the third additional information may include performing the conditional disparity and movement compensation using the third additional information, a reconstructed reference image corresponding to the additional image, a reconstructed previous frame of the additional image, additional disparity information of the previous frame of the additional image, and additional movement information of the previous frame obtained when the previous frame has been reconstructed.

In an embodiment, the performing the conditional disparity and movement compensation using the third additional information, a reconstructed reference image corresponding to the additional image, a reconstructed previous frame of the additional image, additional disparity information of the previous frame of the additional image, and additional movement information of the previous frame obtained when the previous frame has been reconstructed may include performing disparity compensation on a pixel having the additional disparity information of the previous frame within a divided block of the additional image.

In an embodiment, the performing the conditional disparity and movement compensation using the third additional information, a reconstructed reference image corresponding to the additional image, a reconstructed previous frame of the additional image, additional disparity information of the previous frame of the additional image, and additional movement information of the previous frame obtained when the previous frame has been reconstructed may include performing movement compensation on a pixel having movement vector information of the previous frame within a divided block of the additional image.

BRIEF DESCRIPTION OF THE DRAWINGS

FIG. 7 is a block diagram illustrating an apparatus for transmitting P2_picture according to an embodiment.

FIG. 8 is a block diagram illustrating an apparatus for receiving P2_picture according to an embodiment.

DETAILED DESCRIPTION OF THE EMBODIMENTS

Figure 1:
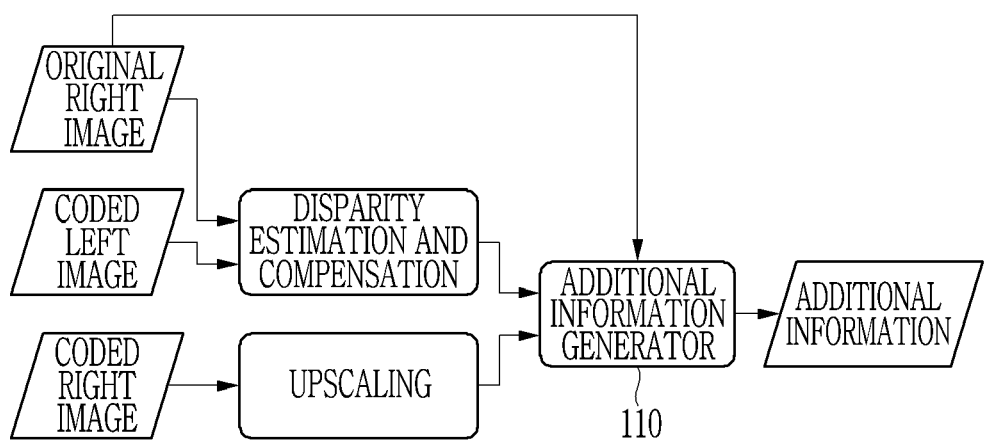
FIG. 1 is a block diagram illustrating an apparatus for transmitting the I_picture according to an embodiment.

In the following detailed description, only certain embodiments of the present disclosure have been shown and described in detail with reference to the accompanying drawing, simply by way of illustration. However, the present disclosure may be implemented in various different forms and is not limited to the embodiments described herein. Further, in order to clearly describe the description in the drawing, parts not related to the description are omitted, and similar reference numerals are attached to similar parts throughout the specification.

Throughout the specification, a terminal may be called user equipment (UE), mobile station (MS), a mobile terminal (MT), an advanced mobile station (AMS), a high reliability mobile station (HR-MS), a subscriber station (SS), a portable subscriber station (PSS), an access terminal (AT), a machine type communication device (MTC device), and the like and may also include all or some of the functions of the MS, the MT, the AMS, the HR-MS, the SS, the PSS, the AT, the UE, the MTCH device, and the like.

In this specification, unless explicitly described to the contrary, the word "comprises", and variations such as "including" or "containing", will be understood to imply the inclusion of stated elements but not the exclusion of any other elements.

In this specification, expressions described in singular can be interpreted as singular or plural unless explicit expressions such as "one" or "single" are used.

As used herein, "A or B", "at least one of A and B", "at least one of A or B", "A, B, or C", "at least one of A, B, and C", and "at least one of A, B, or C" each may include any one of, or all possible combinations of, items listed together in the corresponding one of the phrases.

In this specification, "and/or" includes all combinations of each and at least one of the mentioned elements.

In this specification, terms including ordinal numbers such as first and second may be used to describe various configurations elements, but the elements are not limited by the terms. The terms may be only used to distinguish one element from another element. For example, a first element may be named a second element without departing from the right range of the present disclosure, and similarly, a second element may be named a first element.

In the flowchart described with reference to the drawings in this specification, the order of the operations may be changed, several operations may be merged, certain operations may be divided, and specific operations may not be performed.

In this description, a method for efficiently encoding the VEI for improving image quality of user-selectable stereoscopic media is provided when a fixed/mobile broadcasting user-selectable stereoscopic media service is provided in a terrestrial broadcasting environment that complies with standards such as ATSC2.0 and ATSC3.0.

The VEI may include disparity information and information about a block to be compensated for disparity from a high image quality reference image (e.g., left image of the stereoscopic image), and may further include information that can be additionally utilized in a stereoscopic environment. In general, since the VEI of a very low bit rate is assumed, it is necessary to generate more efficient additional information using as many resources as possible in a given environment.

In this description, the left image of the stereoscopic image is provided to the left eye and the right image of the stereoscopic image is provided to the right eye. The reference image is a reference image among two images constituting the stereoscopic image in the 3DTV service and may be a high-resolution left image or a high-resolution right image. The additional image is additionally applied to the reference image to generate the stereoscopic image in the 3DTV service and may be a low-resolution left image or a low-resolution right image other than the reference image. The decoded image is two images constituting the stereoscopic image in the 3DTV. The reconstructed image is a high-resolution additional image finally reconstructed using the VEI. The VEI is additional data used for the purpose of improving the image quality of the user-selectable stereoscopic media and its specifications are defined in A/104 Part5 Annex B.

When the left image has high resolution and the right image has low resolution, in order to improve the image quality of the right image, a transmitting apparatus may generate the VEI and transmit the VEI to a receiving apparatus and the receiving apparatus may receive the VEI to improve the image quality of the right image.

In an embodiment, a mode (e.g., decoding mode) may be designated for segmentation of the right image (e.g., a quad-tree scheme may be used) and for indicating a method for decoding the right image on each segmented block. If there are many decoding modes to indicate the method for decoding the right image of each block, the right image can be efficiently reconstructed. For example, the VEI may be used for three decoding modes. Modes that can be performed frame-independently among the decoding modes may be used in an intra-coded picture (I_picture) type. When all three decoding modes are used, it can be classified as a predictive-coded picture (P_picture) type.

For example, BASE_MODE (default) and DSP_CMP_MODE may be used for the I_Picture. BASE_MODE may be used to decode the right image by upscaling the decoded low-resolution right image (upscaling). DSP_CMP_MODE may be used to decode the right image by estimating and compensating disparity from the decoded high-resolution left image (disparity estimation and compensation).

BASE_MODE, DSP_CMP_MODE, and PREV_DSP_MODE may be used for the P_Picture. PREV_DSP_MODE may be used for compensating for the disparity in a current frame using disparity information used to reconstruct the previous frame (conditional disparity compensation). Since previously used information is recycled, the disparity information may not be delivered with the present frame.

FIG. 1 is a block diagram illustrating an apparatus for transmitting the I_picture according to an embodiment.

Referring to FIG. 1, a transmitting apparatus 100 may generate information for disparity estimation and compensation using an original right image and an coded left image. Alternatively, the transmitting apparatus 100 may generate information for upscaling of an coded right image.

Thereafter, an additional information generator 110 of the transmitting apparatus 100 may select one of disparity estimation and compensation mode or upscaling mode and may generate the additional information (e.g., VEI) using information corresponding to the selected mode and the original right image.

Figure 2:
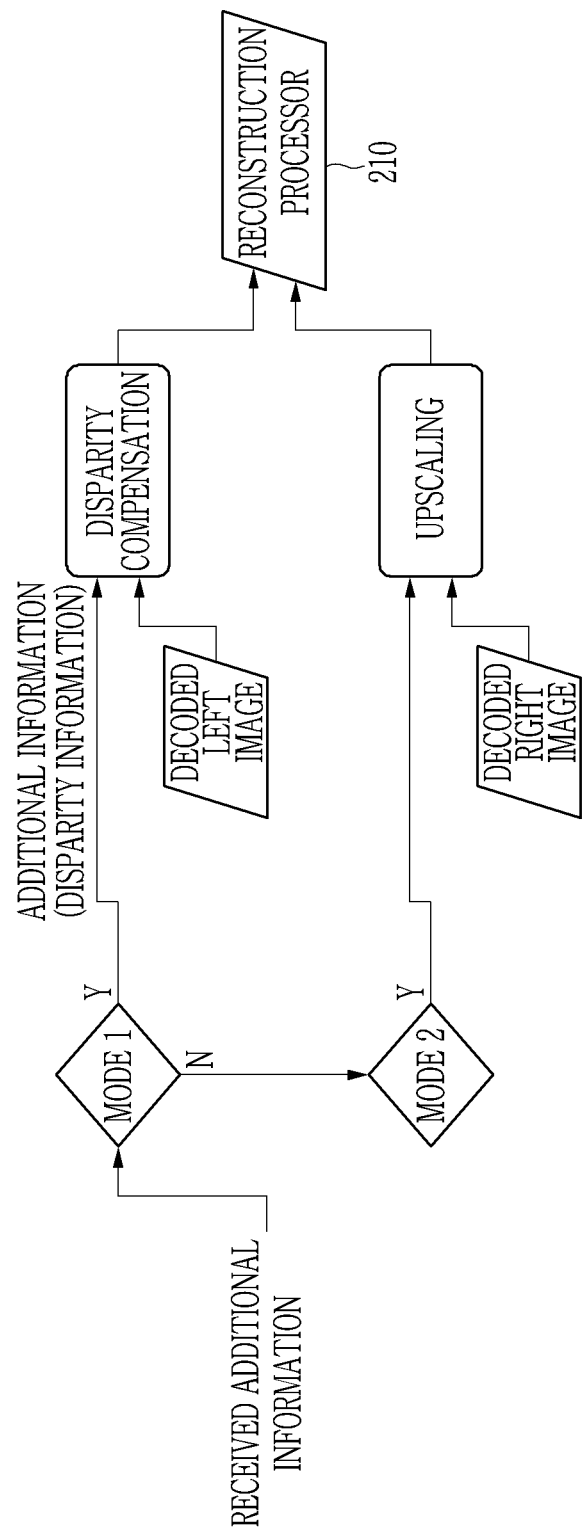
FIG. 2 is a block diagram illustrating an apparatus for receiving the I_picture according to an embodiment.

FIG. 2 is a block diagram illustrating an apparatus for receiving the I_picture according to an embodiment.

Referring to FIG. 2, a receiving apparatus 200 may determine whether the additional information received from the transmitting apparatus 100 is generated according to a mode 1. Here, the mode 1 may be the DSP_CMP_MODE. When the additional information received from the transmitting apparatus 100 is additional information generated according to DSP_CMP_MODE, the receiving apparatus 200 may perform the disparity compensation based on disparity information obtained from the received additional information (e.g., information about a disparity vector generated in the process of the disparity estimation and compensation) and the decoded left image and may reconstruct a high-resolution right image based on a result of the disparity compensation.

When the additional information received from the transmitting apparatus 100 is additional information generated according to BASE_MODE, the receiving apparatus 200 may perform upscaling based on the decoded right image and reconstruct the high-resolution right image based on a result of upscaling.

Figure 3:
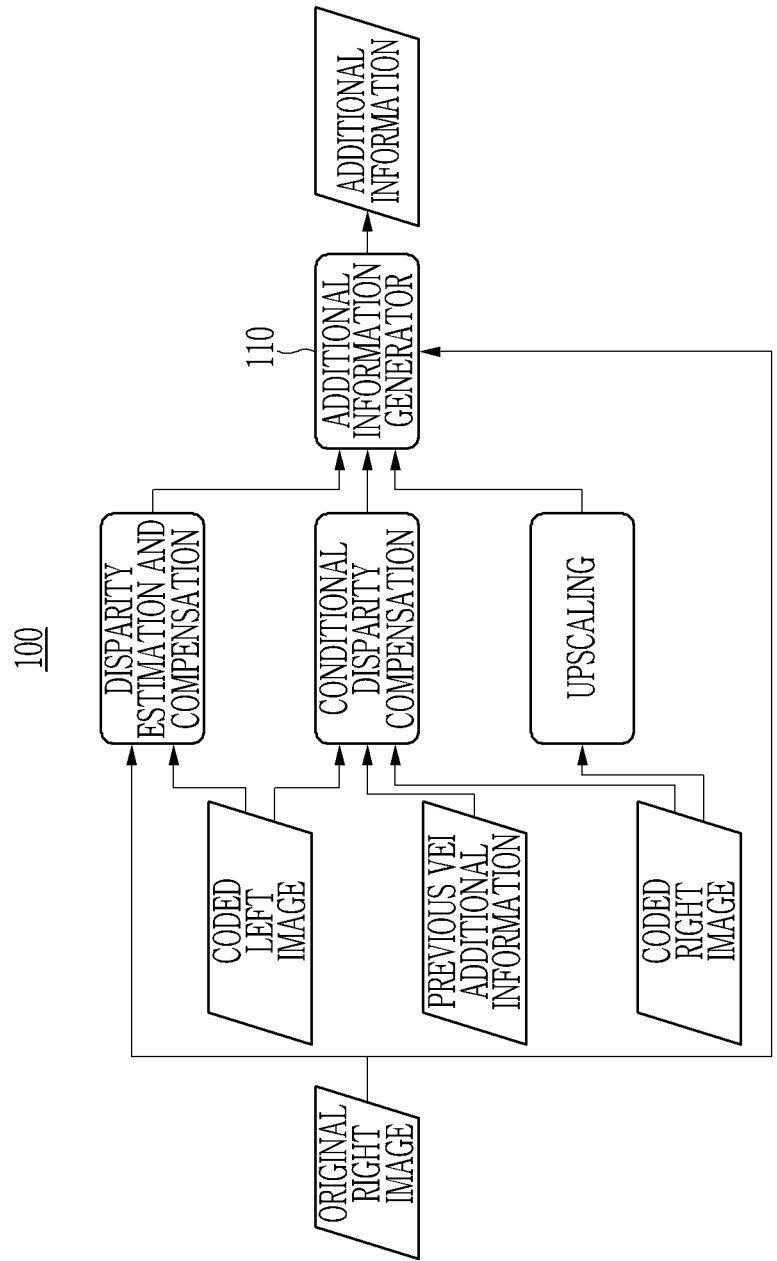
FIG. 3 is a block diagram illustrating an apparatus for transmitting P_picture according to an embodiment.

FIG. 3 is a block diagram illustrating an apparatus for transmitting P_picture according to an embodiment.

Referring to FIG. 3, a transmitting apparatus 100 may generate at least one of information for disparity estimation and compensation, information for conditional disparity compensation, and information for upscaling based on at least one of the original right image, the coded right image, the coded left image, and additional information (or VEI) of the previous frame.

In an embodiment, the transmitting apparatus 100 may generate the information for disparity estimation and compensation using the original right image and the coded left image.

In an embodiment, the transmitting apparatus 100 may generate the information for conditional disparity compensation using the coded left image, the VEI of the previous frame, and the coded right image.

The conditional disparity compensation is a mode in which disparity compensation on a pixel in blocks of the coded right image for which the disparity information of the previous frame exists when the disparity of the left image of the current frame is compensated by using the disparity information determined in the previous frame. Some pixels reconstructed by the receiving apparatus through the conditional disparity compensation may be obtained from the disparity-compensated left image and the remaining pixels may be obtained from the upscaled right image.

Thereafter, the additional information generator 110 of the transmitting apparatus 100 may select one of the disparity estimation and compensation mode, the conditional disparity compensation mode, or the upscaling mode and may generate the additional information for improvement of the image quality of the right image by using information corresponding to the selected mode and the original right image. Then, the transmitting apparatus 100 may transmit the additional information to the receiving apparatus.

Figure 4:
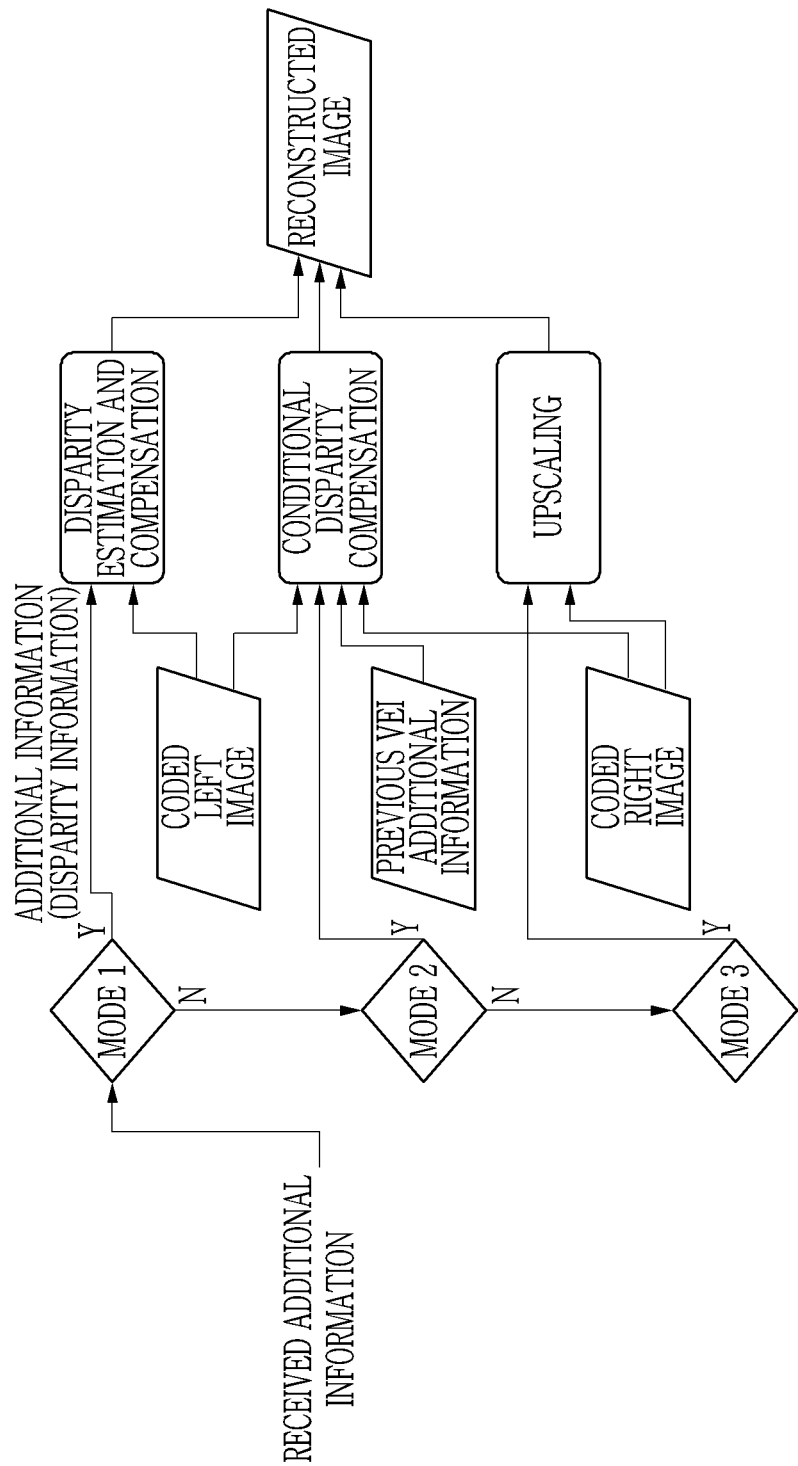
FIG. 4 is a block diagram illustrating an apparatus for receiving P_picture according to an embodiment.

FIG. 4 is a block diagram illustrating an apparatus for receiving P_picture according to an embodiment.

Referring to FIG. 4, the receiving apparatus 200 may determine whether the additional information received from the transmitting apparatus 100 is generated according to which decoding mode. Here, the mode 1 may be a disparity estimation and compensation mode, the mode 2 may be a conditional disparity compensation mode, and the mode 3 may be the upscaling mode.

When the additional information received from the transmitting apparatus 100 is additional information generated according to the disparity estimation and compensation mode, the receiving apparatus 200 may perform the disparity estimation and compensation based on the disparity information obtained from the received additional information (e.g., information about the disparity vector generated in the disparity estimation and compensation process) and decoded left image and reconstruct the high-resolution right image based on the result of disparity estimation and compensation.

When the additional information received from the transmitting apparatus 100 is additional information generated according to the conditional disparity compensation mode, the receiving apparatus 200 may perform the conditional disparity compensation based on the received additional information, the decoded left image, the additional information of the previous frame, and the decoded right image and reconstruct the high-resolution right image based on the result of conditional disparity compensation.

When the additional information received from the transmitting apparatus 100 is additional information generated according to the upscaling mode, the receiving apparatus 200 may perform the upscaling based on the decoded right image and reconstruct the high-resolution right image based on the result of upscaling.

Then, the high-resolution right image generated by the disparity estimation and compensation, the conditional disparity compensation, or the upscaling may be used to play a high-quality 3D image along with the high-resolution left image.

Figure 5:
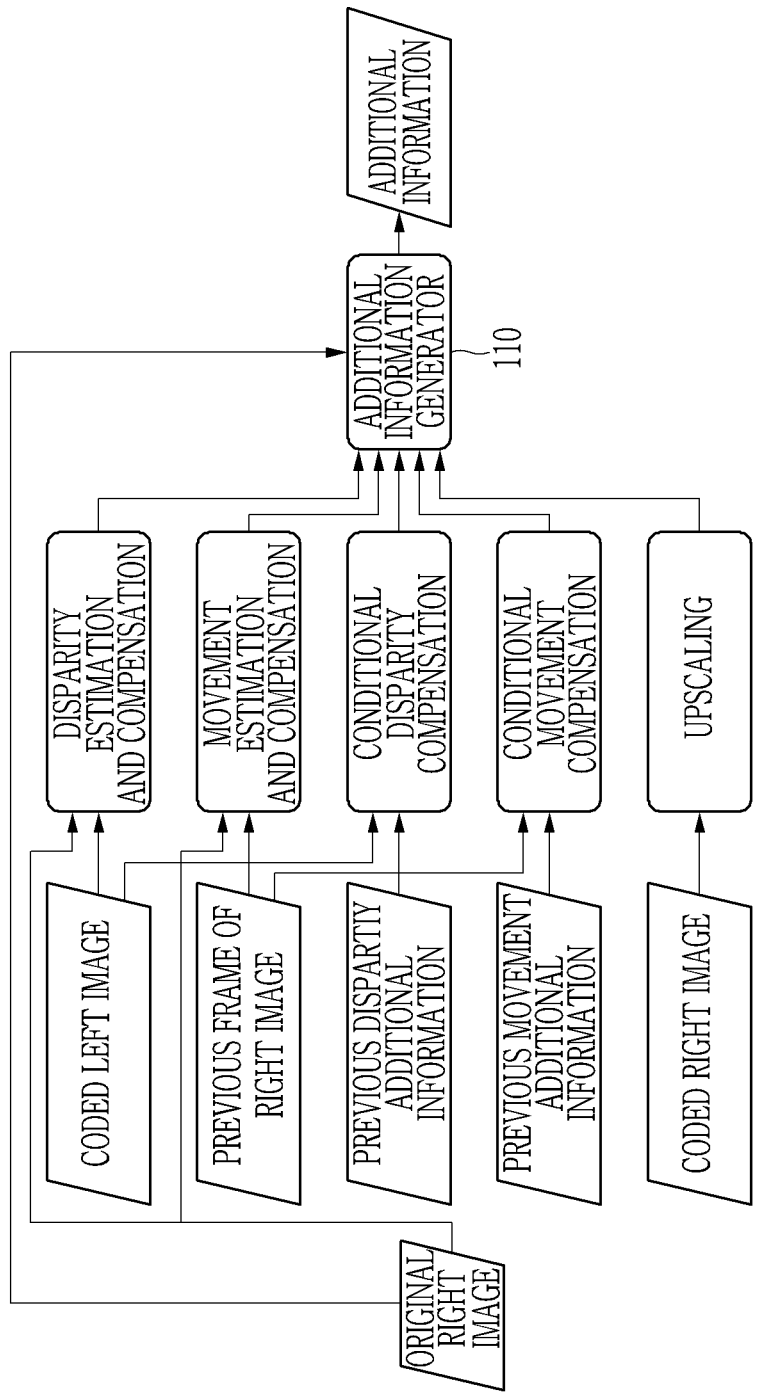
FIG. 5 is a block diagram illustrating an apparatus for transmitting P1_picture according to an embodiment.

FIG. 5 is a block diagram illustrating an apparatus for transmitting P1_picture according to an embodiment.

Referring to FIG. 5, a transmitting apparatus 100 may generate at least one of information for disparity estimation and compensation, information for conditional disparity compensation, and information for upscaling based on at least one of the original right image, the coded right image, the coded left image, and additional information of the previous frame.

In an embodiment, the transmitting apparatus 100 may generate the information for disparity estimation and compensation using the original right image and the coded left image. In an embodiment, the transmitting apparatus 100 may generate the information for upscaling using the coded right image. In an embodiment, the transmitting apparatus 100 may generate the information for conditional disparity compensation using the coded left image, the VEI of the previous frame, and the coded right image.

The conditional disparity compensation may be used for performing the disparity compensation for a pixel that has disparity information of the previous frame among blocks of the coded right image when compensating for disparity of the left image of the current frame using the disparity information determined in the previous frame. Some of the pixels reconstructed by the receiving apparatus through the disparity compensation of the conditional may be obtained from the disparity-compensated left image and the remaining pixels may be obtained from the upscaled right image.

In addition, the transmitting apparatus 100 may generate information for movement estimation and compensation based on the original right image and the previous frame of the right image. The transmitting apparatus 100 may estimate a movement vector based on the difference between the previous frame and the current frame of the right image in order to generate the information for movement estimation and compensation and may generate the information for movement estimation and compensation based on the estimated movement vector.

In addition, the transmitting apparatus 100 may generate information for conditional movement compensation of the current frame of the right image based on the previous frame of the right image and the additional movement information of the previous frame of the right image. The conditional movement compensation may be used to generate a movement-compensated image for the current frame by applying the additional movement information extracted in the reconstruction process of the previous frame. For example, the conditional movement compensation may be used for reconstructing an image (e.g., a high-resolution right image) the frame of time to (the current frame) by applying the movement vector estimated during the time between $t_2$ and $t_1$ to the frame of time $t_1$ (the previous frame) where the time points are sequentially $t_2$, $t_1$, and to in the order of their earliest. In the conditional movement compensation, the movement compensation may be performed for a pixel for which the movement vector information of the previous frame exists in one block.

Then, the additional information generator 110 of the transmitting apparatus 100 may select one of the disparity estimation and compensation mode, the conditional disparity compensation mode, the upscaling mode, the movement estimation and compensation mode, or conditional movement compensation mode and may generate additional information for image quality improvement of the right image by using the information corresponding to the selected mode and the original right image. Then, the transmitting apparatus 100 may transmit the additional information to the receiving apparatus.

In an embodiment, the transmitting apparatus may generate, along with information on the disparity compensation of the high image quality reference image, additional information including movement information at that time and information on a block to be movement-compensated from a high image quality additional image (image to be reconstructed) of the previous time (that is, previous frame).

In an embodiment, the transmitting apparatus may generate additional information for the movement compensation of at least some pixels of the current frame by utilizing the movement vector calculated in the previous frame.

In an embodiment, a recursive structure may be formed by generating the additional information including the movement vector information using the previously reconstructed image. If additional signal processing such as residual signal blockcoding is performed as needed, higher image quality improvement efficiency can be obtained. In addition, the image quality improvement efficiency by the VEI such as disparity compensation and upscaling can be increased.

Figure 6:
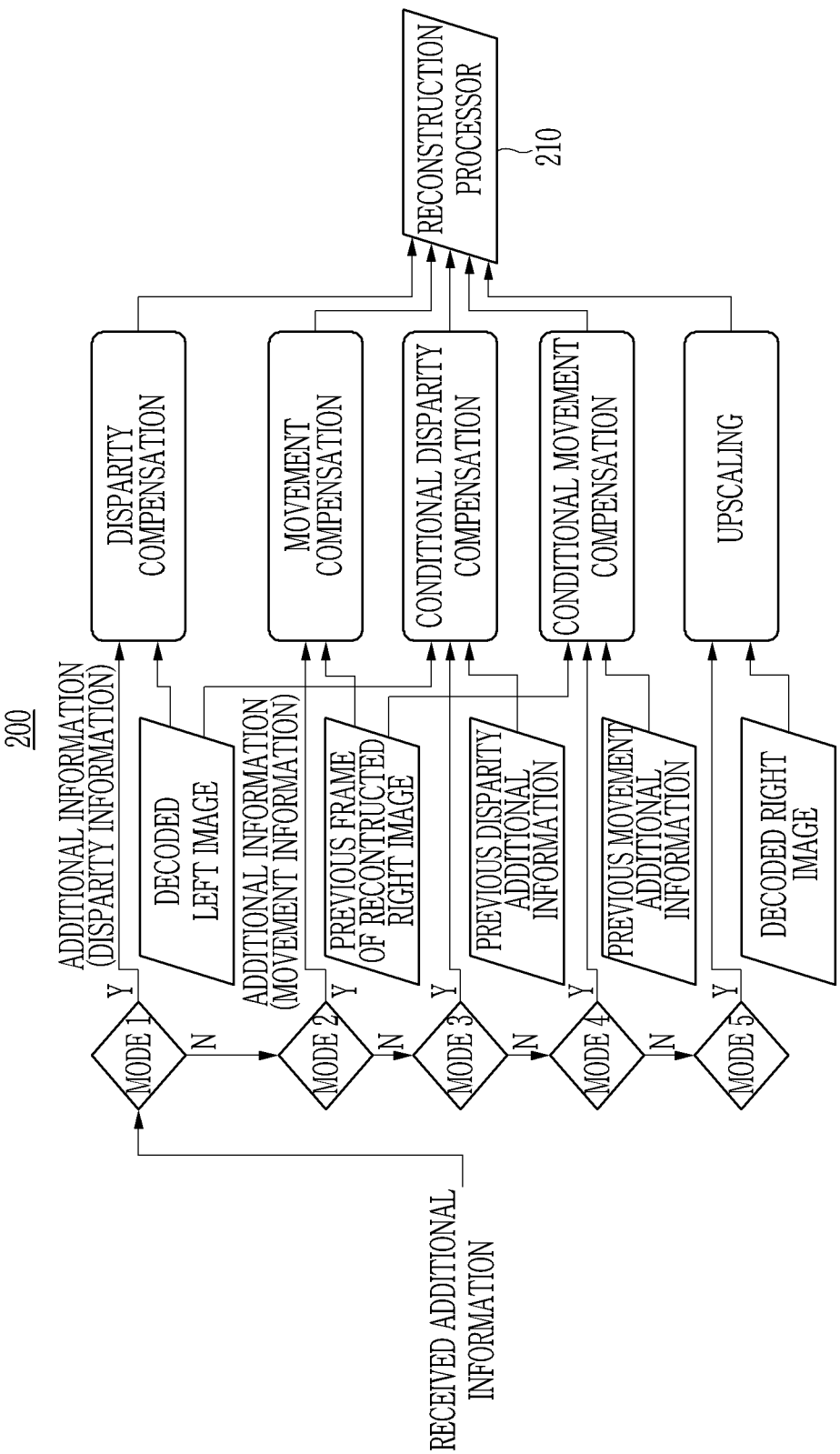
FIG. 6 is a block diagram illustrating an apparatus for receiving P1_picture according to an embodiment.

FIG. 6 is a block diagram illustrating an apparatus for receiving P1_picture according to an embodiment.

Referring to FIG. 6, the receiving apparatus 200 may determine whether additional information received from the transmitting apparatus 100 is generated according to which decoding mode. Here, mode 1 may be a disparity estimation and compensation mode, mode 2 may be a movement estimation and compensation mode, mode 3 may be a conditional disparity compensation mode, mode 4 may be a conditional movement compensation mode, and mode 5 may be an upscaling mode.

When the additional information received from the transmitting apparatus 100 is additional information generated according to the disparity estimation and compensation mode, the receiving apparatus 200 may perform the disparity estimation and compensation based on disparity information obtained from the received additional information (e.g., information about the disparity vector generated in the disparity estimation and compensation process) and decoded left image and may reconstruct a high-resolution right image based on the result of the disparity estimation and compensation.

When the additional information received from the transmitting apparatus 100 is additional information generated according to the movement estimation and compensation mode, the receiving apparatus 200 may perform the movement estimation and compensation based on the movement information (including the movement vector information) obtained from the received additional information and the previous frame of reconstructed right image and may reconstruct a high-resolution right image based on the result of the movement estimation and compensation.

When the additional information received from the transmitting apparatus 100 is additional information generated according to the conditional disparity compensation mode, the receiving apparatus 200 may perform the conditional disparity compensation based on the received additional information, the additional information of the previous frame, and the decoded right image and may reconstruct a high resolution image based on the result of the conditional disparity compensation.

When the additional information received from the transmitting apparatus 100 is additional information generated according to the conditional movement compensation mode, the receiving apparatus 200 may perform the conditional movement compensation based on the received additional information, the reconstructed previous frame of the right image, and additional movement information obtained when the previous frame is reconstructed and may reconstruct a high-resolution right image based on the result of the conditional movement compensation.

When the additional information received from the transmitting apparatus 100 is additional information generated according to the upscaling mode, the receiving apparatus 200 may perform upscaling on the decoded right image and may reconstruct a high-resolution right image based on the result of the upscaling.

Then, the high-resolution right image generated by the disparity estimation and compensation, the movement compensation, the conditional disparity compensation, the conditional movement compensation, or the upscaling may be used to play a high image quality 3D image along with the high-resolution left image.

FIG. 7 is a block diagram illustrating an apparatus for transmitting P2_picture according to an embodiment.

Referring to FIG. 7, a transmitting apparatus 100 may generate at least one of information for disparity estimation and compensation, information for conditional disparity compensation, and information for upscaling based on at least one of the original right image, the coded right image, the coded left image, and additional information of the previous frame.

In an embodiment, the transmitting apparatus 100 may generate the information for disparity estimation and compensation using the original right image and the coded left image. In an embodiment, the transmitting apparatus 100 may generate the information for upscaling using the coded right image. In an embodiment, the transmitting apparatus 100 may generate the information for conditional disparity compensation using the coded left image and the additional information of the previous frame.

In addition, the transmitting apparatus 100 may generate information for the movement estimation and compensation based on the original right image and the previous frame of the right image. The transmitting apparatus 100 may estimate a movement vector based on the difference between the previous frame and the current frame of the right image in order to generate the information for movement estimation and compensation and may generate the information for movement estimation and compensation based on the estimated movement vector.

In addition, the transmitting apparatus 100 may generate information for conditional disparity and movement compensation based on the coded left image, the previous frame of the right image, the additional information of the previous frame, and the additional movement information of the previous frame of the right image. The conditional disparity and movement compensation may be used for performing disparity compensation and movement compensation by applying additional disparity information and additional movement information of the previous frame to the current frame. Since each pixel may have either additional disparity information or additional movement information, the disparity compensation and movement compensation may not be simultaneously applied to one pixel. The disparity compensation or the movement compensation may be performed on a pixel having disparity information or movement vector information of the previous frame among pixels included in one block. Pixels that are not reconstructed through the disparity compensation or the movement compensation may be reconstructed from the upscaled right image.

Thereafter, the additional information generator 110 of the transmitting apparatus 100 may select at least one of the disparity estimation and compensation mode, the movement estimation and compensation mode, the conditional disparity compensation mode, the conditional movement compensation mode, the conditional disparity and movement compensation mode, or the upscaling mode and may generate additional information for image quality improvement of the right image by using information corresponding to the selected mode and the original right image. Then, the transmitting apparatus 100 may transmit the generated additional information to the receiving apparatus.

In an embodiment, the transmitting apparatus may generate the additional information for conditional disparity compensation or movement compensation of individual pixels by utilizing both additional disparity information and movement vectors obtained in the previous frame.

FIG. 8 is a block diagram illustrating an apparatus for receiving P2_picture according to an embodiment.

Referring to FIG. 8, the receiving apparatus 200 may determine whether additional information received from the transmitting apparatus 100 is generated according to which decoding mode. Here, mode 1 may be a disparity estimation and compensation mode, mode 2 may be a movement compensation mode, mode 3 may be a conditional disparity compensation mode, mode 4 may be a conditional movement compensation mode, mode 5 may be a conditional disparity and movement compensation mode, and mode 6 may be an upscaling mode. Thereafter, the receiving apparatus 200 may reconstruct an additional image (e.g., an additional image corresponds to a low-resolution right image) to a high resolution using the received additional information.

When the additional information received from the transmitting apparatus 100 is additional information generated according to the disparity estimation and compensation mode, the receiving apparatus 200 may perform the disparity estimation and compensation based on the decoded left image (the left image corresponds to the right image (that is, the additional image) and the left image is received by the receiving apparatus as the reference image) and the disparity information obtained from the received additional information (e.g., information about the disparity vector generated in the disparity estimation and compensation process) and may reconstruct the high-resolution right image based on the disparity estimation and compensation result.

When the additional information received from the transmitting apparatus 100 is additional information generated according to the movement compensation mode, the receiving apparatus 200 may perform movement estimation and compensation of the current frame based on movement information (including the movement vector information) obtained from the received additional information and the reconstructed previous frame of the right image and may reconstruct the high-resolution right image based on the result of the movement estimation and compensation.

When the additional information received from the transmitting apparatus 100 is additional information generated according to the conditional disparity compensation mode, the receiving apparatus 200 may perform the conditional disparity compensation based on the received additional information, the decoded left image, and the additional disparity information of the previous frame of the right image and may reconstruct the high-resolution right image based on the result of the conditional disparity compensation.

When the additional information received from the transmitting apparatus 100 is additional information generated according to the conditional movement compensation mode, the receiving apparatus 200 may perform the conditional movement compensation based on the additional information, the reconstructed previous frame of the right image, and the additional movement information of the previous frame obtained when the previous frame is reconstructed and may reconstruct the high-resolution right image based on the result of the conditional movement compensation.

When the additional information received from the transmitting apparatus 100 is additional information generated according to the conditional disparity and movement compensation mode, the receiving apparatus 200 may perform the conditional disparity and movement compensation based on the received additional information, the reconstructed left image, the reconstructed previous frame of the right image, the additional disparity information of the previous frame of the right image, and the additional movement information of the previous frame obtained when the previous frame is reconstructed and may reconstruct the high-resolution right image based on the result of the conditional disparity and movement compensation.

When the additional information received from the transmitting apparatus 100 is additional information generated according to the upscaling mode, the receiving apparatus 200 may perform the upscaling based on the decoded right image and reconstruct the high-resolution right image based on the result of the upscaling.

Afterwards, the high-resolution right image generated by the disparity estimation and compensation, the movement compensation, the conditional disparity compensation, the conditional movement compensation, the conditional disparity and movement compensation, or the upscaling may be used for playing a high image quality 3D image with the high-resolution left image.

Figure 9A:
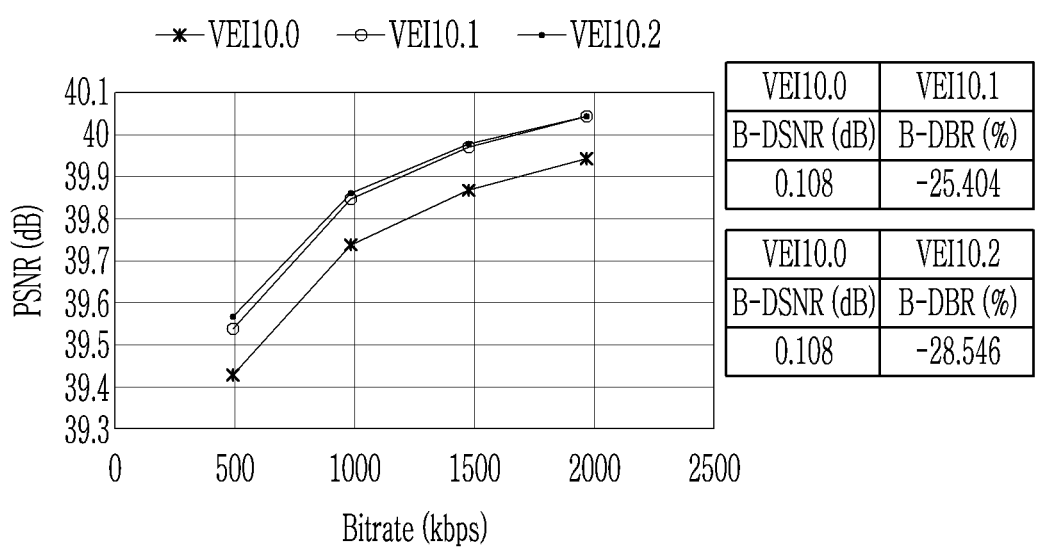
FIG. 9A and FIG. 9B are graphs illustrating performance of the additional information of the P1 picture and the P2 picture according to an embodiment.
Figure 9B:
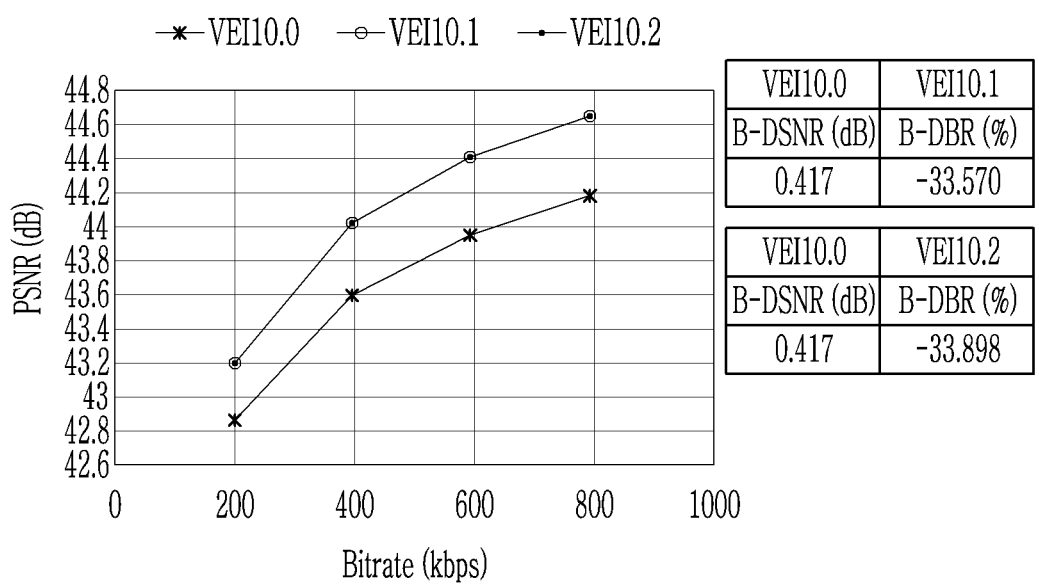

FIG. 9A and FIG. 9B are graphs illustrating performance of the additional information of the P1 picture and the P2 picture according to an embodiment.

Referring to FIG. 9A and FIG. 9B, the performance of the additional information for the P-picture (VEI10.0), the additional information for the P1-picture (VEI10.1), and the additional information for the P2-picture (VEI10.2) may be shown.

In an embodiment, the picture of the image corresponding to the VEI10.0 may be [I, P, P, P, P, . . . ], the picture of the image corresponding to the VEI10.1 may be [I, P1, P1, P1, P1, . . . ], and the picture of the image corresponding to the VEI10.2 may be [I, P2, P2, P2, P2, . . . ].

The performance difference between the VEI10.0 and the VEI10.1 and the performance difference between the VEI10.0 and the VEI10.2 may be displayed through B-DSNR and B-DBR. The B-DSNR and B-DBR may be used to calculate a value representing the performance differences between each other using coordinates on the coordinate plane of PSNR-Bitrate in FIG. 9A and FIG. 9B.

The B-DSNR is a value representing performance through a difference in the PSNR and may represent a PSNR difference when the bitrate between two VEIs is the same.

The B-DBR is a value representing performance through a difference in bitrate and may represent a difference in bitrate when the PSNR between two VEIs is the same.

In FIG. 9A, the performance of the additional information used when reconstructing a low resolution additional image (e.g., low resolution is 960×540 resolution) of a live-action movie called Secret of the Universe into a high resolution image (e.g., high resolution is 3840×2160) is compared.

Referring to FIG. 9A, the performance of the VEI10.1 and the VEI10.2 is 25-28% better than that of VEI10.0.

Referring to FIG. 9B, the performance of the additional information used when reconstructing a low-resolution additional image (e.g., low resolution is 960×540 resolution) of an animation movie called Nubjob to a high resolution image (e.g., high resolution is 3840×2160) is compared.

Referring to FIG. 9B, the performance of the VEI10.1 and the VEI10.2 is 33% better than that of VEI10.0.

As described above, by using the additional information of the present description, the receiving apparatus of the stereoscopic image can more efficiently improve the image quality of user-selectable stereoscopic media.

Figure 10:
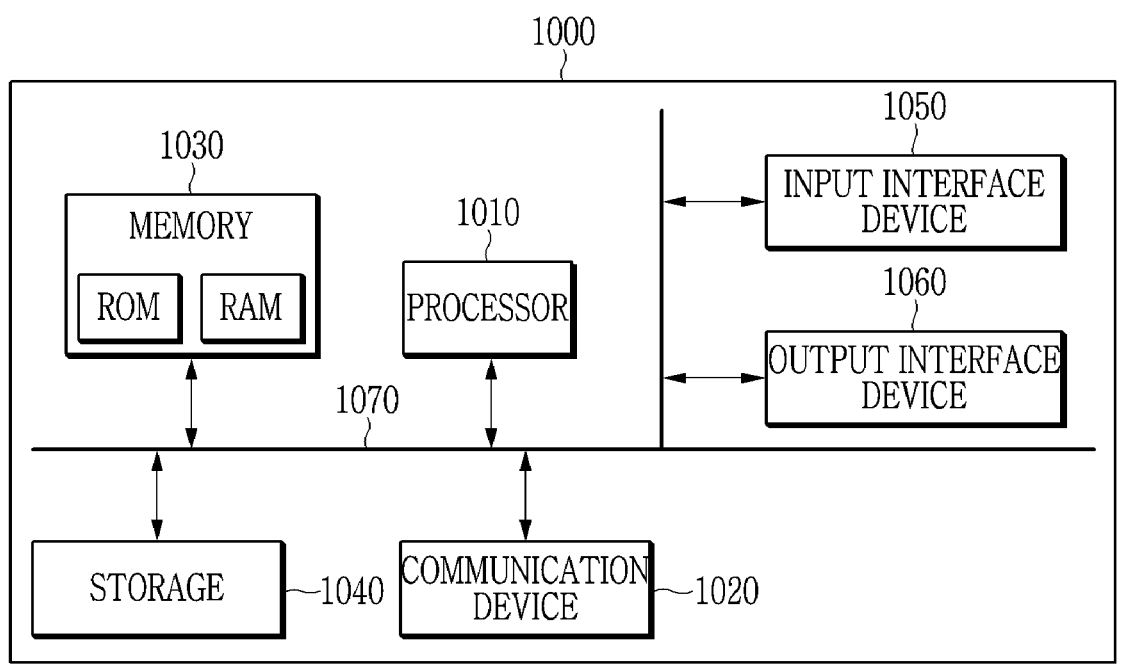
FIG. 10 is a block diagram illustrating an apparatus according to an embodiment.

FIG. 10 is a block diagram illustrating an apparatus according to an embodiment.

The apparatus according to embodiments may be implemented as a computer system, for example, a computer-readable medium. Referring to FIG. 10, the computer system 1000 may include at least one of a processor 1010, a memory 1030, an input interface device 1050, an output interface device 1060, and a storage device 1040 communicating through a bus 1070. The computer system 1000 may also include a communication device 1020 coupled to the network. The processor 1010 may be a central processing unit (CPU) or a semiconductor device that executes instructions stored in the memory 1030 or the storage device 1040. The memory 1030 and the storage device 1040 may include various forms of volatile or nonvolatile storage media. For example, the memory may include read only memory (ROM) or random-access memory (RAM). In the embodiment of the present disclosure, the memory may be located inside or outside the processor, and the memory may be coupled to the processor through various means already known. The memory is a volatile or nonvolatile storage medium of various types, for example, the memory may include read-only memory (ROM) or random-access memory (RAM).

According to an exemplary embodiment of the present disclosure, the computer system 1000 may include a processor (e.g., computer, microprocessor, CPU, ASIC, circuitry, logic circuits, etc.) and an associated non-transitory memory storing software instructions which, when executed by the processor, provides the functionalities of the processor 1010, the communication device 1020, the input interface device 1050 and the output interface device 1060. Herein, the memory and the processor may be implemented as separate semiconductor circuits. Alternatively, the memory and the processor may be implemented as a single integrated semiconductor circuit. The processor may embody one or more processor(s).

Accordingly, the embodiment may be implemented as a method implemented in the computer, or as a non-transitory computer-readable medium in which computer executable instructions are stored. In an embodiment, when executed by a processor, the computer-readable instruction may perform the method according to at least one aspect of the present disclosure.

The communication device 1020 may transmit or receive a wired signal or a wireless signal.

On the contrary, the embodiments are not implemented only by the apparatuses and/or methods described so far, but may be implemented through a program realizing the function corresponding to the configuration of the embodiment of the present disclosure or a recording medium on which the program is recorded. Such an embodiment can be easily implemented by those skilled in the art from the description of the embodiments described above. Specifically, methods (e.g., network management methods, data transmission methods, transmission schedule generation methods, etc.) according to embodiments of the present disclosure may be implemented in the form of program instructions that may be executed through various computer means, and be recorded in the computer-readable medium. The computer-readable medium may include program instructions, data files, data structures, and the like, alone or in combination. The program instructions to be recorded on the computer-readable medium may be those specially designed or constructed for the embodiments of the present disclosure or may be known and available to those of ordinary skill in the computer software arts. The computer-readable recording medium may include a hardware device configured to store and execute program instructions. For example, the computer-readable recording medium can be any type of storage media such as magnetic media like hard disks, floppy disks, and magnetic tapes, optical media like CD-ROMs, DVDs, magneto-optical media like floptical disks, and ROM, RAM, flash memory, and the like.

Program instructions may include machine language code such as those produced by a compiler, as well as high-level language code that may be executed by a computer via an interpreter, or the like.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software. The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers.

A computer program(s) may be written in any form of a programming language, including compiled or interpreted languages, and may be deployed in any form including a stand-alone program or a module, a component, a subroutine, or other units suitable for use in a computing environment.

A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random-access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks.

Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium.

A processor and a memory may be supplemented by, or integrated into, a special purpose logic circuit. The processor may run an operating system 08 and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements.

For example, a processor device may include multiple processors or a processor and a controller. In addition, different processing configurations are possible, such as parallel processors. Also, non-transitory computer-readable media may be any available media that may be accessed by a computer, and may include both computer storage media and transmission media.

The present specification includes details of a number of specific implements, but it should be understood that the details do not limit any disclosure or what is claimable in the specification but rather describe features of the specific example embodiment.

Features described in the specification in the context of individual example embodiments may be implemented as a combination in a single example embodiment. In contrast, various features described in the specification in the context of a single example embodiment may be implemented in multiple example embodiments individually or in an appropriate sub-combination.

Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above-described example embodiments in all example embodiments, and it should be understood that the above-described program components and apparatuses may be incorporated into a single software product or may be packaged in multiple software products.

While this disclosure has been described in connection with what is presently considered to be practical example embodiments, it is to be understood that this disclosure is not limited to the disclosed embodiments.

On the contrary, it is intended to cover various modifications and equivalent arrangements included within the spirit and scope of the appended claims.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

What is claimed is:

1. An apparatus for generating additional information for reconstructing an additional image, the apparatus comprising:

a processor and memory, wherein the processor executes a program stored in the memory to perform:

generating information for movement compensation based on an original right image of a stereoscopic image and a previous frame of the right image; and generating first additional information to reconstruct the right image to high resolution based on the original right image and the information for movement compensation, wherein:

the processor executes the program to further perform:

generating information for conditional movement compensation of a current frame of the right image based on the previous frame of the right image and additional movement information of the previous frame of the right image; and generating second additional information based on the original right image and the information for conditional movement compensation.

2. The apparatus of claim 1, wherein:
when generating information for movement compensation based on an original right image of a stereoscopic image and a previous frame of the right image, the processor performs
estimating a movement vector based on difference between the previous frame of the right image and a current frame of the right image.

3. The apparatus of claim 1, wherein:
the processor executes the program to further perform:
generating information for conditional disparity and movement compensation of the right image based on encoded left image of the stereoscopic image, the previous frame of the right image, additional information of the previous frame, and additional movement information of the previous frame of the right image; and
generating third additional information based on the original right image and the information for conditional disparity and movement compensation.

4. An apparatus for receiving an additional image, the apparatus comprising:
a processor and memory, wherein the processor executes a program stored in the memory to perform:
performing movement estimation and compensation for the additional image based on first additional information when additional information for reconstructing the additional image is the first additional information for movement compensation of the additional image; and
reconstructing the additional image to high resolution based on a result of the movement estimation and compensation,
wherein:
the processor executes the program to further perform:
performing conditional movement compensation for a current frame of the additional image based on second additional information when the additional information is the second additional information for conditional movement compensation of the additional image; and
reconstructing the additional image to high resolution based on a result of the conditional movement compensation.

5. The apparatus of claim 4, wherein:
when performing movement estimation and compensation for the additional image based on first additional information, the processor performs
performing the movement estimation and compensation of a current frame of the additional image using movement information obtained from the first additional information and a reconstructed previous frame of the additional image.

6. The apparatus of claim 4, wherein:
when performing the conditional movement compensation for the current frame of the additional image based on the second additional information, the processor performs
performing the conditional movement compensation using the second additional information, reconstructed previous frame of the additional image, and additional movement information of the previous frame obtained when the previous frame has been reconstructed.

7. The apparatus of claim 6, wherein:
when performing the conditional movement compensation using the second additional information, reconstructed previous frame of the additional image, and additional movement information of the previous frame, the processor performs
performing movement compensation on a pixel having a movement vector of the previous frame within a divided block of the additional image.

8. The apparatus of claim 4, wherein:
the processor executes the program to further perform:
performing conditional disparity and movement compensation for a current frame of the additional image based on third additional information when the additional information is the third additional information for the conditional disparity and movement compensation of the additional image; and
reconstructing the additional image to high resolution based on a result of the conditional disparity and movement compensation.

9. The apparatus of claim 8, wherein:
when performing the conditional disparity and movement compensation for a current frame of the additional image based on the third additional information, the processor performs
performing the conditional disparity and movement compensation using the third additional information, a reconstructed reference image corresponding to the additional image, a reconstructed previous frame of the additional image, additional disparity information of the previous frame of the additional image, and additional movement information of the previous frame obtained when the previous frame has been reconstructed.

10. The apparatus of claim 9, wherein:
when performing the conditional disparity and movement compensation using the third additional information, a reconstructed reference image corresponding to the additional image, a reconstructed previous frame of the additional image, additional disparity information of the previous frame of the additional image, and additional movement information of the previous frame obtained when the previous frame has been reconstructed, the processor performs
performing disparity compensation on a pixel having the additional disparity information of the previous frame within a divided block of the additional image.

11. A method for receiving an additional image, the method comprising:
performing movement estimation and compensation for the additional image based on first additional information when additional information for reconstructing the additional image is the first additional information for movement compensation of the additional image;
reconstructing the additional image to high resolution based on a result of the movement estimation and compensation,
performing conditional movement compensation for a current frame of the additional image based on second additional information when the additional information is the second additional information for conditional movement compensation of the additional image; and
reconstructing the additional image to high resolution based on a result of the conditional movement compensation.

12. The method of claim 11, wherein:
performing movement estimation and compensation for the additional image based on first additional information comprises
performing the movement estimation and compensation of a current frame of the additional image using movement information obtained from the first additional information and a reconstructed previous frame of the additional image.

13. The method of claim 11, wherein:
the performing the conditional movement compensation for the current frame of the additional image based on the second additional information comprises
performing the conditional movement compensation using the second additional information, reconstructed previous frame of the additional image, and additional movement information of the previous frame obtained when the previous frame has been reconstructed.

14. The method of claim 13, wherein:
the performing the conditional movement compensation using the second additional information, reconstructed previous frame of the additional image, and additional movement information of the previous frame obtained when the previous frame has been reconstructed comprises
performing movement compensation on a pixel having a movement vector of the previous frame within a divided block of the additional image.

15. The method of claim 11 further comprises:
performing conditional disparity and movement compensation for a current frame of the additional image based on third additional information when the additional information is the third additional information for the conditional disparity and movement compensation of the additional image; and
reconstructing the additional image to high resolution based on a result of the conditional disparity and movement compensation.

16. The method of claim 15, wherein:
the performing the conditional disparity and movement compensation for a current frame of the additional image based on the third additional information comprises
performing the conditional disparity and movement compensation using the third additional information, a reconstructed reference image corresponding to the additional image, a reconstructed previous frame of the additional image, additional disparity information of the previous frame of the additional image, and additional movement information of the previous frame obtained when the previous frame has been reconstructed.

17. The method of claim 15, wherein:
the performing the conditional disparity and movement compensation using the third additional information, a reconstructed reference image corresponding to the additional image, a reconstructed previous frame of the additional image, additional disparity information of the previous frame of the additional image, and additional movement information of the previous frame obtained when the previous frame has been reconstructed comprises
performing movement compensation on a pixel having movement vector information of the previous frame within a divided block of the additional image.

* * * * *